Nov. 21, 1939.  W. S. HARLEY  2,180,521

PISTON

Filed Dec. 8, 1937

INVENTOR
WILLIAM S. HARLEY
BY
Wheeler, Wheeler & Wheeler
ATTORNEYS

Patented Nov. 21, 1939

2,180,521

UNITED STATES PATENT OFFICE 2,180,521

PISTON

William S. Harley, Milwaukee, Wis., assignor to Harley-Davidson Motor Company, Milwaukee, Wis., a corporation of Wisconsin Application December 8, 1937, Serial No. 178,675

8 Claims. (Cl. 309—13)

My invention relates to improvements in internal combustion engine pistons, with particular reference to motorcycle pistons and other pistons subject to high temperatures and requirements for light weight and extremely rapid reciprocation.

Aluminum pistons, and similar light weight pistons, are made oval in the skirting, with the longest diameter in the central vertical plane of the thrust faces of the piston, and the smallest diameter in the plane which includes the axis of the piston pin or wrist pin. This is done so that the piston will have little or no clearance in the direction of thrust, and plenty of clearance for expansion in line with the piston pin. In skirtings that are not truly oval the same rule prevails as to relative clearance.

The fact that aluminum pistons operate at close clearances across their thrust faces makes it necessary to separate the head from one or both thrust faces of the skirt by providing an arcuate slot in a plane below and adjacent to the lower packing ring. This permits the piston to remain at approximately cylinder diameter across the thrust faces, while allowing it to expand in the opposite direction, i. e., in a direction at right angles to the longer diameter.

Aluminum has a high co-efficient of expansion and contraction, and with temperatures above 500 degrees F. it rapidly loses strength. In motors operating at high temperatures, that of the piston head sometimes rises to about 800 degrees F., or nearly to the degree at which aluminum becomes plastic. In such cases the temperature of the piston skirt in the vicinity of the piston bosses may be as high as 750 degrees F., but that in the thrust faces is considerably lower, conduction of heat from the piston head being interrupted by the slots, and transfer of heat to the comparatively cool cylinder walls being rapid by reason of actual or approximate contacts. As shown by a fuse metal test, the temperature at the piston boss may be about 750 degrees F., and that of the thrust portions of the skirt may not exceed 500 degrees F.

Through years of experience in the manufacture and use of motorcycle motors, there has been almost continuous trouble by reason of the collapse or breakage of pistons, particularly in the thrust portions of the skirts. Pistons of the aluminum type, which have no struts of any description, have been contoured and slotted in virtually every conceivable manner without avoiding collapse or breakage, or both, and those employing steel struts to anchor the skirt to the piston bosses often fail for the reason that the struts are apt to tear loose from the case metal when the latter is weakened by the high temperatures prevalent in those areas.

Another type of piston, built and tested experimentally, is provided with a cross pin or tubular steel strut connecting or supporting the thrust faces at points adjacent to the slots which separate the skirt from the head. Such struts prevent collapse at the connected points, but tend to distort the thrust portions of the skirt and allow the open end of the piston to collapse across the thrust faces. Such collapse at the open end of the piston is as objectionable as it is in the vicinity of the slot. Also, cross bolts or tubular steel struts show considerable lag in absorption of heat and undue heat storing capacity while the cast metal is cooling.

I have discovered that it is possible to provide a cast metal piston of the aluminum type with a form of strut which will prevent collapse of the thrust faces of the skirt at any point, which will resiliently oppose expansion and contraction of the thrust portions, which will have anchorage in the coolest portions of the piston, which will maintain such anchorage under all operating conditions because of the relatively short range of temperature variation and avoidance of weakening temperatures, and which will permit of a reenforcement of the thrust portions of the skirt in a manner to prevent cracking or breaking.

It is my object to utilize the above mentioned discoveries in the production of durable pistons of light cast metal for motorcycles and other engines operating at high speeds and under high temperatures.

A further object is to provide pistons having oval skirtings with form-maintaining resiliently yieldable struts, anchored in the thrust portions of the skirt in such a manner as to effectually maintain the form of the skirt and prevent breaking or cracking of the cast metal of which the skirt is composed.

A further object is to provide a light metal piston casting with a reenforcing beam of maximum depth in the direction of piston movement, and minimum thickness consistent with proper maintenance of the contour of the thrust portions of the skirt without affecting the piston pin, the associated portions of the piston and the piston head, as to stresses, temperatures, or mode of operation.

In the drawing.

Like parts are identified by the same reference characters throughout the several views.

Figure 2:
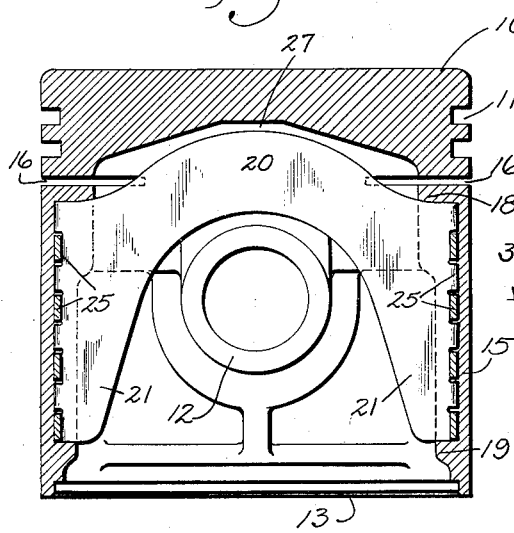
Figure 2 is a sectional view drawn to line 2—2 of Figure 1.
Figure 1:
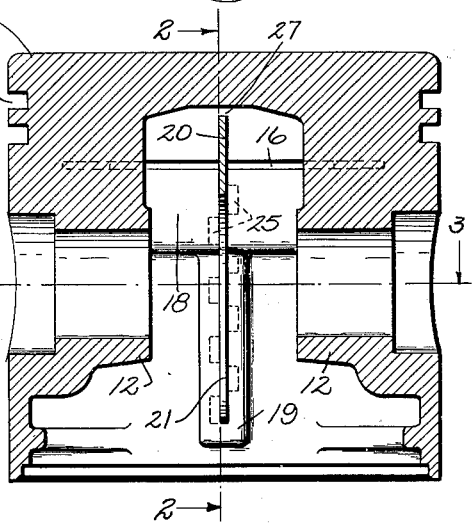
Figure 1 is a sectional view of my improved piston, drawn to a plane intersecting the axes of the wrist pin sockets.
Figure 4:
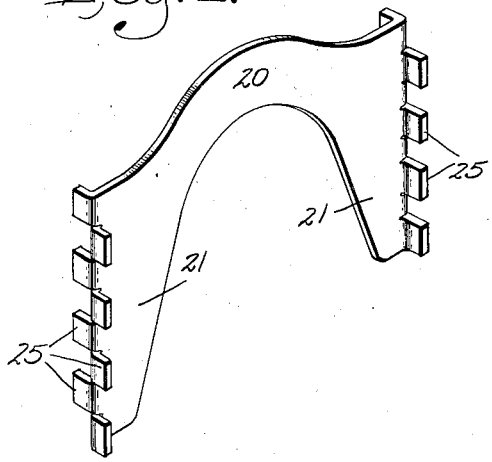
Figure 4 is a detail view of the reenforcing web.

In my improved piston, the piston head 10, with its piston ring receiving channels 11, the piston pin bosses 12 and associated portions of the skirt, may be of any ordinary construction, although I prefer to make these parts sufficiently thick to dispense with the necessity for embedded reenforcement or reenforcing materials of differing composition. The side portions 15 of the skirt, i. e., the portions on opposite sides of the central portion of the wrist pin axis, are partially separated from the piston head 10 by the arcuate slots 16, and these portions 15 are each provided with an annularly extending reenforcing rib 18 and a vertically extending rib 19, the latter being located substantially midway between the wrist pin carrying portions 13. All portions of the piston thus far described may be formed of a light metal casting, such as alloyed aluminum or magnesium, but in the mold I insert a thin reenforcing cross web of more highly resilient material, such as steel, and a lower co-efficient of expansion. This web has an arched central portion 20 which extends across the space over the piston pin and has downwardly extending legs 21 which reach nearly to the bottom of the skirting portion 15, with their side margins embedded in the reenforcing rib 19. The cross web is preferably formed of tool steel or spring steel.

Figure 3:
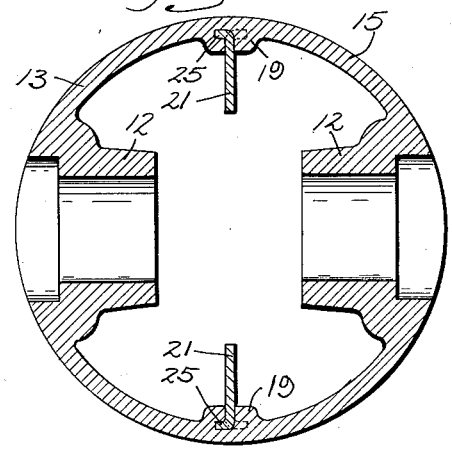
Figure 3 is a sectional view drawn to line 3—3 of Figure 1.

The side margins of the web legs 21 are slitted to form lips 25, which are then alternately bent in opposite directions for anchorage in the reenforcing ribs 19, as best shown in Figure 3. Clearance is provided between the upper margin of this reenforcing web and the piston head 10, as indicated at 27, whereby the central portion of the reenforcing web may have a slight vertical movement in correspondence with a slight outward and inward movement of the leg portions 21 of the web when the piston is expanding or contracting.

The tensile strength of aluminum varies little at temperatures ranging between 300 degrees F. and 500 degrees F., but it drops rapidly at higher temperatures and becomes negligible at a temperature of approximately 800 degrees F. Temperatures ranging between 700 degrees F. and 800 degrees F. are common in motorcycle pistons, and therefore the danger of a collapse of the so-called "bearing portions" 15 of the skirt is very great except when reenforced as herein described. Attempted reenforcements of the upper portion of the skirt have been of little avail, since they failed to prevent a collapse of the lower portion. Also, at such high temperatures wide variations in temperature between those existing under prolonged operating conditions and those existing when the motor is cold, tend to develop cracks, particularly at the respective ends of the slots 16, whereas the above described reenforcement prevents the vibration and the strains which initiate such cracks.

Inasmuch as the expansion of my improved reenforcing web of resilient ferrous material is less than that of the skirt, the thrust portions of the skirt are placed under indrawing tension during motor operation, thereby tending to hold these portions of the skirt out of contact with the cylinder wall.

Also, when the motor is cold, contraction of the skirt applies pressure to the embedded margins of the web. The resistance of the web tends to reduce the range of skirt contraction. The resilience of the legs 21 permits a slight inward movement, although their resistance to such movement tends to reduce the range of skirt contraction in the thrust areas.

It is important that the central portion of arch 20 of the web be free for movement in correspondence with these outward and inward movements of the legs 21. Therefore, no connecting fins should be allowed to form between the piston head and the web during the casting operation. Such fins not only interfere with free adjustments of the web under varying temperatures, but if permitted to form during the casting operation the legs of the web tend to spread and become outwardly biased.

My improved reenforcing strut is designed to provide considerable depth of beam in the direction of stress. Therefore, the web can be made very thin, and its total weight need not exceed three quarters of an ounce, and due to the character of the reenforcement, pistons of minimum weight and maximum durability may be produced.

The reenforcing legs 21, with their outer side margins embedded in the thrust portions of the skirting, may have some value as reenforcing and heat transferring members independently of their connection with each other by the arched portion 20.

However, the arched portion 20 is of considerable importance, not only because of the mutual reenforcing effects obtained by its use, but because of its function as a tensioning member to modify the movements of the associated portions of the skirting during expansion and contraction and maintain the original contours.

The form of strut herein described provides adequate support throughout the length of the skirt and prevents collapse of the thrust faces at any point. The strut is anchored in the coolest portions of the piston. These portions of the piston are in virtual contact with the cylinder walls, and because of their distance and partial separation from the more highly heated portions, the temperature never rises above 500 degrees F. At such temperatures the aluminum provides a strong anchorage for the strut, and in fact the presence of the strut also makes it possible to provide the thrust portions with reenforcing ribs near the ends of the slots, as well as along the lines of anchorage. A thickening of the wall near the ends of the slots is important because of the high temperatures prevailing immediately beyond the ends of the slots and the wide temperature differential in a comparatively small area at these points.

Experience has shown that a piston strengthened by reenforcing ribs immediately below the slots will stick or score in the cylinder after a few minutes of operation because of rapid heat transfer in the ribs, and also because of the fact that the thrust portion of the skirt will expand in direct ratio to the co-efficient of expansion of aluminum with a change of temperature. Up to 500 degrees F. the aluminum retains practically all of its original strength, and therefore the piston is very stiff, and with such uncontrolled expansion of a close fitting piston, the thrust portion of the skirt exerts tremendous pressure on the cylinder walls. The improved strut prevents such normal expansion of the aluminum in the thrust portions of the skirt and keeps the piston at substantially constant clearance by resisting outward expansion, as well as inward collapse.

I claim:

1. In an internal combustion engine piston, the combination with the bearing portions of the skirting, of a thin reenforcing web disposed in a vertical plane and having its outer side margins embedded in said portions of the skirting, said web having a co-efficient of expansion less than that of the skirting and extending inwardly in a plane substantially at right angles to the piston pin, the central portions of the web being arched in free space over the central portion of the wrist pin, the lower ends of the web being resiliently yielding and having their outer margins in fixed engagement with the lower ends of the bearing portions of the skirt.

2. In an internal combustion engine piston, the cimbination with those portions of the skirting distant and substantially midway between the ends of the piston pin, of a thin steel reenforcing web located in a central vertical plane at right angles to the piston pin with its outer side margins provided with laterally extending anchoring projections cast in embedded relation to the skirting, and with the web forming an arch over the piston pin, free from connection with either the piston pin or the piston head, said portions of the skirting being provided with interior vertically extending ribs receiving the embedded marginal portions of the web from a point near the top of the skirting to a point near the lower margin thereof.

3. In an internal combustion engine piston, the combination with those portions of the skirting distant and substantially midway between the ends of the piston pin, of a thin steel reenforcing web located in a central vertical plane at right angles to the piston pin with its outer side margins provided with laterally extending anchoring projections cast in embedded relation to the skirting, and with the web forming an arch over the piston pin, free from connection with either the piston pin or the piston head, said portions of the skirting being provided with interior vertically extending ribs receiving the embedded marginal portions of the web from a point near the top of the skirting to a point near the lower margin thereof, said portions of the skirting being partially severed from the piston head by arcuate slots, whereby the position thereof is determined by the web and the portions of the skirting associated with the piston pin.

4. In an internal combustion engine piston, the combination with the bearing portions of the skirting, of a thin reenforcing web disposed in a vertical plane and having vertically extending thin steel reenforcing and resiliently yielding legs having their outer side margins cast in embedded relation to said portions of the skirting substantially throughout the length of said portions of the skirting, the cast metal composing said skirtings being interiorly thickened arcuately along their upper margins and vertically in the web engaging portions thereof.

5. A piston comprising a light metal casting having a tensioning connection of thin resilient material of a lower co-efficient of expansion, the margins of which are fixedly anchored in the piston skirting substantially throughout its vertical length, the central portion of the web being arched over the central portion of the space to be occupied by the wrist pin when the piston is installed, the associated skirting portions being free to conform to positions predetermined by the expansion and contraction of the reenforcing material notwithstanding differences in the degree of expansion and contraction of the other portions of the piston.

6. An internal combustion engine light metal piston of cast metal, having a slightly elliptical integrally continuous skirting with the bearing portions of the skirting provided with a form maintaining ferrous reenforcement extending downwardly from the top portion of the skirting along the center line of the bearing portion, with progressively increasing resilience in the direction of the lower end of the skirting and adapted to resist extreme expansion and contraction of the light metal while imposing thereon stresses tending to hold the engaged portions of the skirting to substantially their original portions and contours, all other portions of the cast metal being free for normal expansion and contraction.

7. A piston of the described class, having the bearing portions of its skirt free from direct connection with the piston head and cross connected by a thin web having a relatively low co-efficient of expansion marginally anchored to the bearing portions substantially throughout their vertical length, said web being intermediately unconnected with any other portions of the piston, and adapted to resiliently yield sufficiently to allow the anchored portions to impose predetermined resistance and form maintaining stresses upon the bearing portions during expansion and contraction of the piston.

8. A cast light metal piston in the form of an inverted cup, having a slightly oval integrally continuous skirting, partially severed from the head at the upper end of its bearing portions, said bearing portions being reenforced by a thin arch of spring steel in form maintaining anchorage with the piston skirting along vertical center lines midway between the piston pin sockets, said arch being otherwise free from the cast metal and adapted to resiliently oppose movement of the connected portions of the skirting in correspondence with the expanding and contracting movements of the other portions of the piston.

WILLIAM S. HARLEY.

CERTIFICATE OF CORRECTION.

Patent No. 2,180,521.  November 21, 1939.

WILLIAM S. HARLEY.

It is hereby certified that error appears in the printed specification of the above numbered patent requiring correction as follows:- Page 3, first column, line 23, claim 2, for "cimbination" read combination; and second column, line 33, claim 6, for "portions" read positions; and that the said Letters Patent should be read with this correction therein that the same may conform to the record of the case in the Patent Office.

Signed and sealed this 16th day of January, A. D. 1940.

(Seal)

Henry Van Arsdale,
Acting Commissioner of Patents.